(12) United States Patent
Kleinsasser

(10) Patent No.: US 8,403,157 B2
(45) Date of Patent: Mar. 26, 2013

(54) STORING RACK FOR CORE SAMPLE BOXES

(75) Inventor: Jonathan Kleinsasser, Ste. Agathe (CA)

(73) Assignee: Crystal Spring Colony Farms Ltd, Ste. Agathe, MB (CA)

( * ) Notice: Subject to any disclaimer, the term of this patent is extended or adjusted under 35 U.S.C. 154(b) by 482 days.

(21) Appl. No.: 12/640,917

(22) Filed: Dec. 17, 2009

(65) Prior Publication Data
US 2011/0147325 A1    Jun. 23, 2011

(51) Int. Cl.
*A47B 43/00* (2006.01)
(52) U.S. Cl. .......... 211/191; 211/192; 403/49; 403/246
(58) Field of Classification Search ............... 211/191, 211/192, 182; 403/255, 256, 190, 49 X, 403/246 X; 182/186.8
See application file for complete search history.

(56) References Cited

U.S. PATENT DOCUMENTS

| | | | | |
|---|---|---|---|---|
| 1,978,963 A * | 10/1934 | Schwaab | ...................... | 249/218 |
| 2,366,676 A * | 1/1945 | Rosenthal | ..................... | 108/180 |
| 2,878,079 A * | 3/1959 | Hyre | ................................ | 403/49 |
| 2,897,013 A * | 7/1959 | Delp | ................................ | 52/645 |
| 3,606,023 A * | 9/1971 | Edmunds | ....................... | 211/74 |
| 3,751,081 A * | 8/1973 | Schimmel et al. | ............. | 403/49 |
| 4,340,130 A * | 7/1982 | Payne et al. | ................ | 182/186.9 |
| 4,462,197 A * | 7/1984 | D'Alessio et al. | ............. | 52/637 |
| 4,481,748 A * | 11/1984 | D'Alessio et al. | ............. | 52/638 |
| 4,493,578 A * | 1/1985 | D'Alessio | ....................... | 403/49 |
| 4,624,373 A | 11/1986 | Caron | | |
| 5,135,077 A * | 8/1992 | Shalders | ......................... | 182/82 |
| 5,145,030 A * | 9/1992 | Pavlescak et al. | ........... | 182/113 |
| 5,263,296 A * | 11/1993 | Spera | ............................. | 52/638 |

* cited by examiner

*Primary Examiner* — Korie H. Chan
(74) *Attorney, Agent, or Firm* — Adrian D. Battison; Ade & Company Inc

(57) ABSTRACT

A rack for storing elongate core sample boxes is formed from two separate frames each having three upright posts formed of tubular steel and a plurality of steel tubes extending across between the posts and welded to the posts. The frames can be transported in assembled form and then connected across the top and bottom of the uprights by metal bridging members with C-shaped inserts into the ends of the posts. The structure is held together and braced by diagonal braces which attach to tabs on the bridging members by a wedge drive into a slot in the tab.

13 Claims, 6 Drawing Sheets

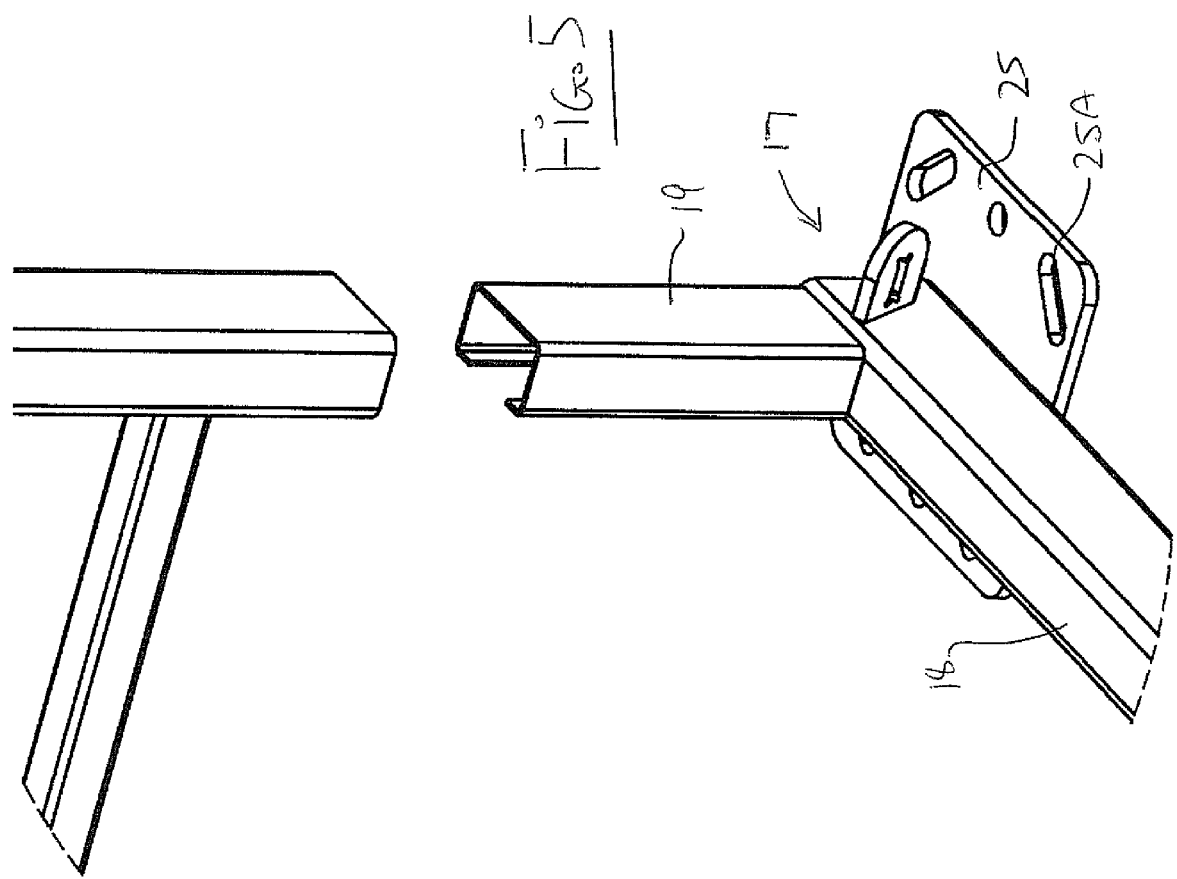

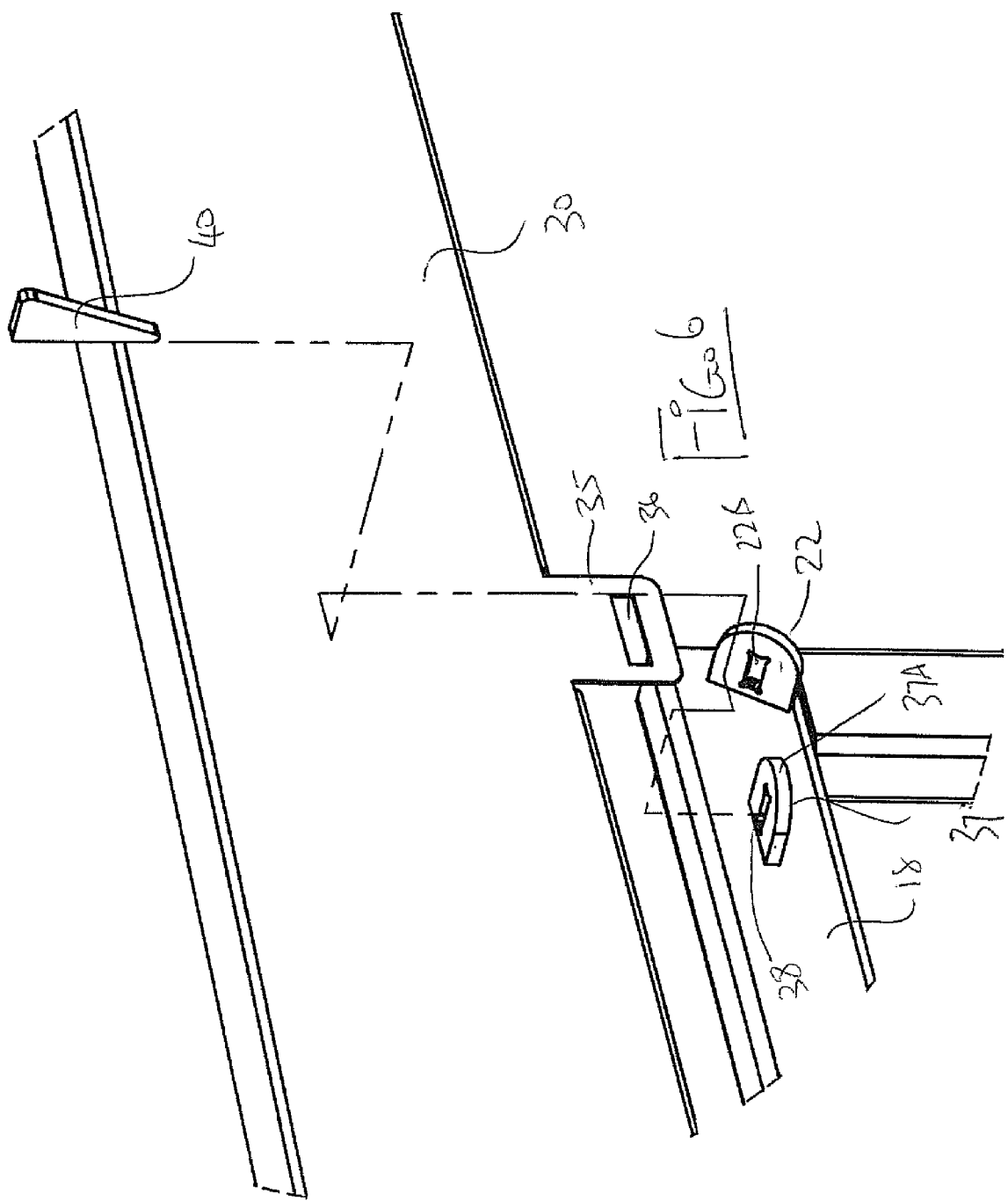

STORING RACK FOR CORE SAMPLE BOXES

This invention relates to a rack for the storing of core sample boxes.

BACKGROUND OF THE INVENTION

In geological exploration, large numbers of core samples are drilled from the earth to provide information concerning the earth's structure in the geological area concerned. Such a core sample may be of the order of 3000 feet in length and as it is withdrawn from the earth, it is collected in boxes so as to provide a permanent record of the earth's structure at that location.

In order to avoid transport of large number of core boxes, often in areas where there is no organized transportation, the boxes need to be stored on site for future record. It will be appreciated that after incurring the considerable expense of a core sample bore, it is highly desirable to ensure that the core sample is maintained for future study when future exploration is being carried out possibly for different reasons. The core samples are typically collected in 5 feet lengths in elongated boxes, often formed of wood or cardboard, each containing three such samples.

Racks for such boxes were traditionally been manufactured on site and are prone to twisting or warping thus, effectively locking the boxes in position in the racks. This of course renders the whole storage system totally useless since it prevents recovery of the boxes for future study without considerable effort to remove the warping. Furthermore, the manufacture of the racks on site has been a long and time consuming business with difficulty in assembling the racks initially in untwisted form and often in harsh climatic conditions.

In U.S. Pat. No. 4,624,373 (Caron) issued Nov. 24, 1986 is disclosed a rack for storing elongate core sample boxes which is formed from three separate frames each having three uprights formed of timber, cross members of timber and a plurality of aluminum tubes extending across between the uprights and passing through bores in the uprights. Each junction between a tube and an upright is locked in position by a nail passing transversely to the tube through the upright. The frames can be transported in assembled form and then the rack completed by the application of end and top panel sheets of plywood or the like.

SUMMARY OF THE INVENTION

It is one object of the present invention to provide a rack which can be quickly or easily assembled on site and which avoids the problem of twisting of the rack thus allowing the core samples to be recovered readily at any time, for future study.

According to one aspect of the invention there is provided a rack for storing elongate core sample boxes comprising:

a plurality of rectangular support frames;

each frame being formed as a separate transportable unit;

each frame including a plurality of spaced parallel uprights;

each frame including a plurality of parallel support rails attached to the uprights at spaced positions therealong and extending at right angles thereto such that the uprights and the rails lie in a common plane of the frame;

the rails being arranged to support rows of core sample boxes extending between the frames;

the frames being connected by top and bottom bridging members;

the top bridging members extending between a top of the upright of one frame and a top of the upright of a next adjacent frame;

the bottom bridging members extending between a bottom of the upright of one frame and a bottom of the upright of a next adjacent frame;

wherein the uprights and the rails are formed of metal and the ends of the rails are welded to the sides of the uprights.

Preferably the uprights and the rails are formed from metal tube.

Preferably the only connection between the uprights of the frames is provided by the rails.

Preferably each frame includes three uprights.

Preferably there are only two frames for supporting the core racks along their length.

Preferably the top and bottom bridging members are formed from metal tube and each includes a rail and a pair of insert members at right angles to the rail for sliding insertion into an end of the tube forming the upright.

Preferably the insert members are C-shaped in cross section.

Preferably there is provided a first diagonal brace extending between the top of an upright of said one frame and the bottom of an upright of said next adjacent frame and a second diagonal brace extending between the bottom of the upright of said one frame and the top of the upright of said next adjacent frame.

Preferably the braces are formed as flat metal straps.

Preferably the braces engage the top and bottom bridging members so as to hold the bridging members in engagement with the uprights.

Preferably the braces include at each end a slot for engagement over a tab such that the tab extends into the slot with a portion of the tab exposed beyond the brace and wherein there is provided an opening in the exposed portion of the tab for receiving a wedge member driven into the opening to hold the exposed portion tight in the slot of the brace.

Preferably the wedge member has tapered sides so as to provide a wedging action between an end of the slot and a surface of the brace.

Preferably the opening is a slot and the wedge member is a flat metal plate.

Preferably the slot is longitudinal of the brace and the tab lies at an angle to the upright so as to pass through the slot.

Preferably the bottom bridging members include foot pads on an underside for attachment to a supporting surface.

Preferably the top bridging members are attached to respective roof trusses for supporting a roof panel to cover the rack.

Preferably each truss is attached to the respective top bridging by a depending flange which includes a slot for engagement over a tab attached to the top bridging member such that the tab extends into the slot with a portion of the tab exposed beyond the flange and wherein there is provided an opening in the exposed portion of the tab for receiving a wedge member driven into the opening to hold the exposed portion tight in the slot of the flange.

Preferably the wedge member has tapered sides so as to provide a wedging action between an end of the slot and a surface of the brace.

Preferably the opening is a slot and the wedge member is a flat metal plate.

According to a second aspect of the invention there is provided a rack for storing elongate core sample boxes comprising:

a plurality of rectangular support frames;

each frame being formed as a separate transportable unit;

each frame including a plurality of spaced parallel uprights;

each frame including a plurality of parallel support rails attached to the uprights at spaced positions therealong and extending at right angles thereto such that the uprights and the rails lie in a common plane of the frame;

the rails being arranged to support rows of core sample boxes extending between the frames;

the frames being connected by top and bottom bridging members;

the top bridging members extending between a top of the upright of one frame and a top of the upright of a next adjacent frame;

the bottom bridging members extending between a bottom of the upright of one frame and a bottom of the upright of a next adjacent frame;

wherein there is provided a first diagonal brace extending between the top of an upright of said one frame and the bottom of an upright of said next adjacent frame and a second diagonal brace extending between the bottom of the upright of said one frame and the top of the upright of said next adjacent frame;

wherein the braces engage the top and bottom bridging members so as to hold the bridging members in engagement with the uprights.

According to a third aspect of the invention there is provided a rack for storing elongate core sample boxes comprising:

a plurality of rectangular support frames;

each frame being formed as a separate transportable unit;

each frame including a plurality of spaced parallel uprights;

each frame including a plurality of parallel support rails attached to the uprights at spaced positions therealong and extending at right angles thereto such that the uprights and the rails lie in a common plane of the frame;

the rails being arranged to support rows of core sample boxes extending between the frames;

the frames being connected by connecting members;

wherein the connecting members are attached to the frames by a slot and tab connection arranged such that the tab extends into the slot with a portion of the tab exposed;

and wherein there is provided an opening in the exposed portion of the tab for receiving a wedge member driven into the opening to hold the exposed portion tight in the slot.

BRIEF DESCRIPTION OF THE DRAWINGS

One embodiment of the invention will now be described in conjunction with the accompanying drawings in which:

FIG. 5 is a partly exploded and enlarged view of a bottom corner of the rack of FIG. 2 showing the connection between the upright and the bottom bridge member.

FIG. 6 is a partly exploded and enlarged view of a connection between the roof truss and top bridge member of the rack of FIG. 2.

In the drawings like characters of reference indicate corresponding parts in the different figures.

DETAILED DESCRIPTION

Figure 1:
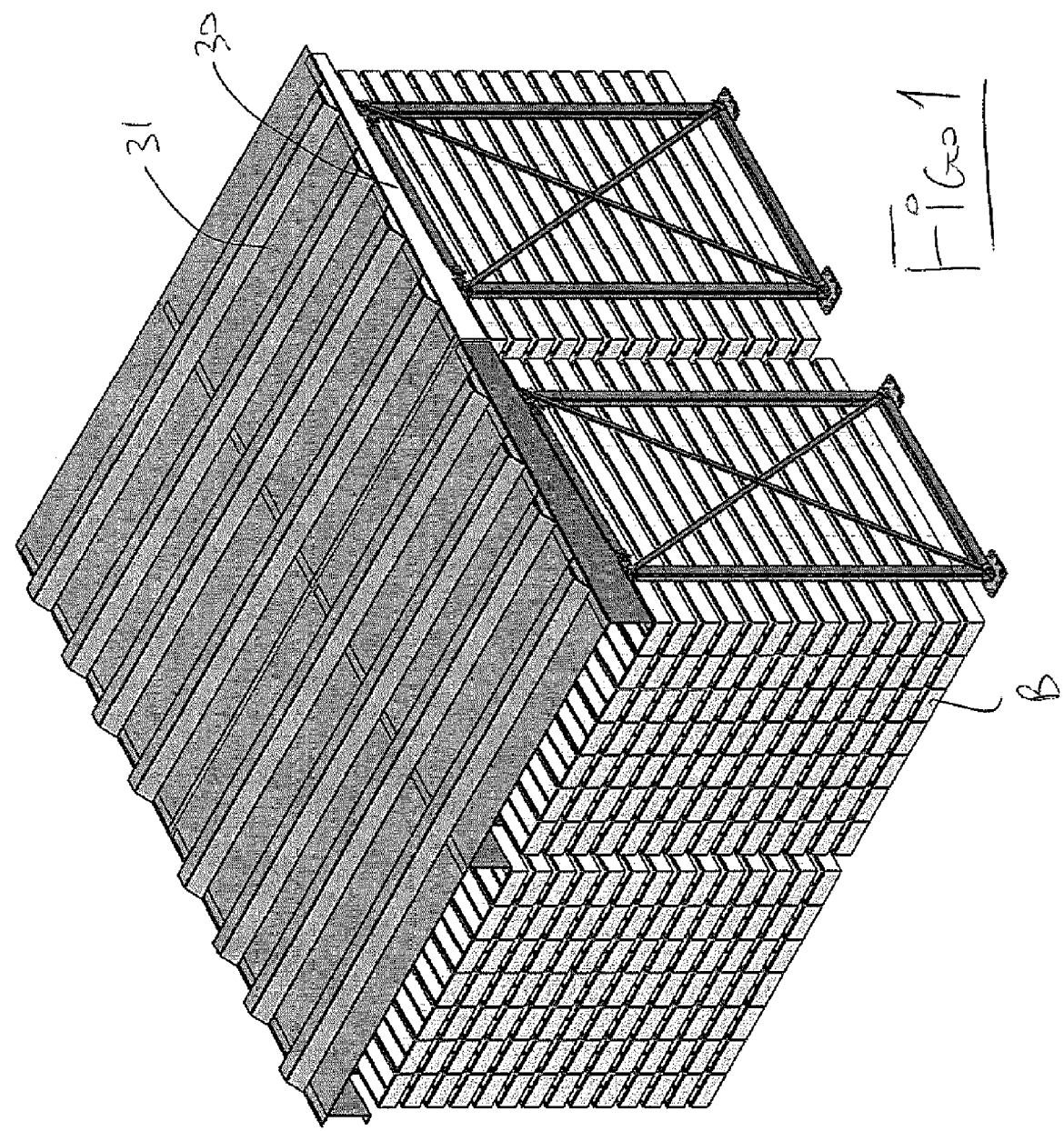
FIG. 1 is an isometric view of two of the racks according to the present invention side by side with a roof covering both racks.
Figure 2:
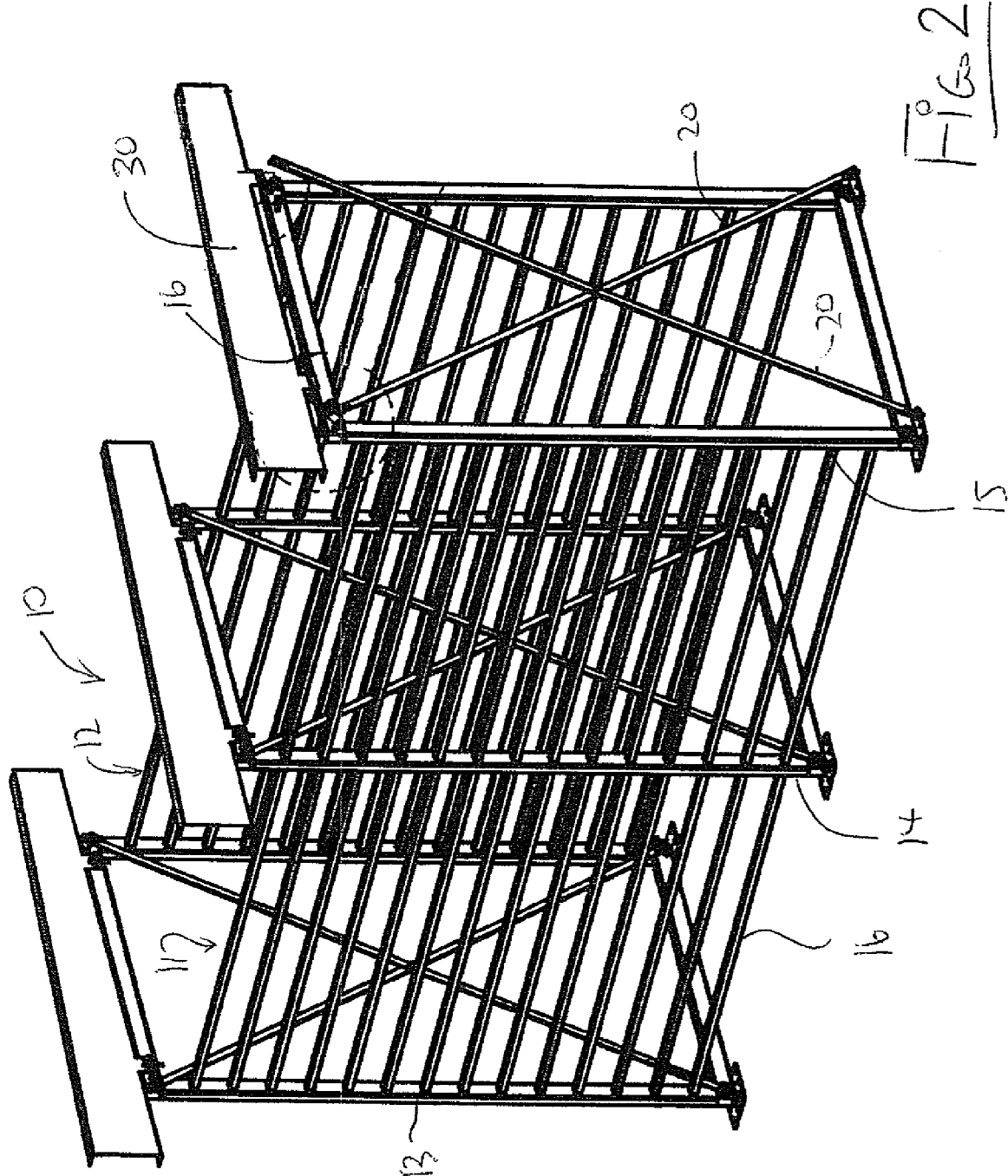
FIG. 2 is an isometric view of one of the racks of FIG. 1 with the roof removed.

The rack 10 for storing elongate core sample boxes B is shown in FIG. 2. The boxes are arranged in rows and columns as shown in FIG. 1. The rack comprises two rectangular support frames 11 and 12 each including three spaced parallel uprights or posts 13, 14 and 15 and a plurality of parallel support rails 16 welded to the uprights at spaced positions therealong and extending at right angles thereto such that the uprights and the rails lie in a common plane of the frame. The posts are formed by steel tubes and the rails 16 are tubes of a smaller transverse dimension welded to one side face of the post. The post 14 is arranged in the middle with rails on each side. This forms therefore two sections for receiving the rows of boxes.

The only connection between the posts of the frames is provided by the rails so that there is no top or bottom connection piece of a different construction or dimension to the rails. There are only two frames 11 and 12 for supporting the core boxes along their length so that they are spaced by a distance less than the length of the boxes so as to balance the boxes across the rails. Each frame is formed as a separate transportable unit defined only by the posts and the rails.

Figure 3:
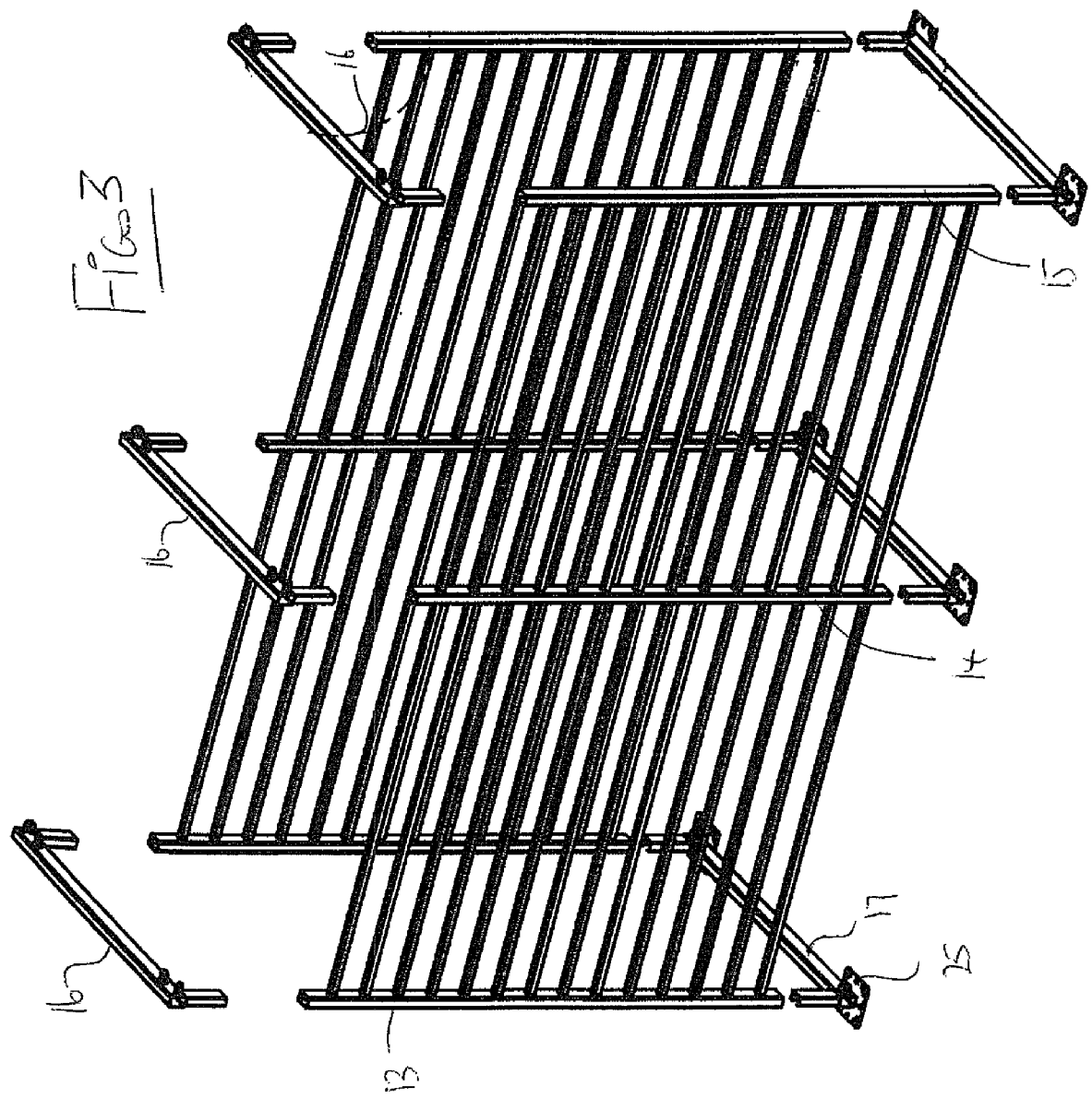
FIG. 3 is a partly exploded view of the rack of FIG. 2.

As shown in FIG. 3, the frames are connected by top bridging members 16 and bottom bridging members 17. As shown in FIG. 5, each bridging member comprises a tubular cross rail 18 and a pair of insert pieces 19. Thus the top bridging members 16 extend between a top of the upright 13 of one frame and a top of the upright 13 of a next adjacent frame and symmetrically the bottom bridging members 17 extend between a bottom of the upright 13 of one frame and a bottom of the upright 13 of the next adjacent frame.

The top and bottom bridging members are formed from metal tube of the same dimension as the posts. The pair of insert members 19 welded at right angles to the rail are arranged for sliding insertion into an end of the tube forming the upright. The insert members are C-shaped in cross section so that they can be pressed into the interior of the tube. The C-shape can allow the insert piece to be squeezed so as to compress to form a press fit. The insert piece can also be tapered.

Figure 4:
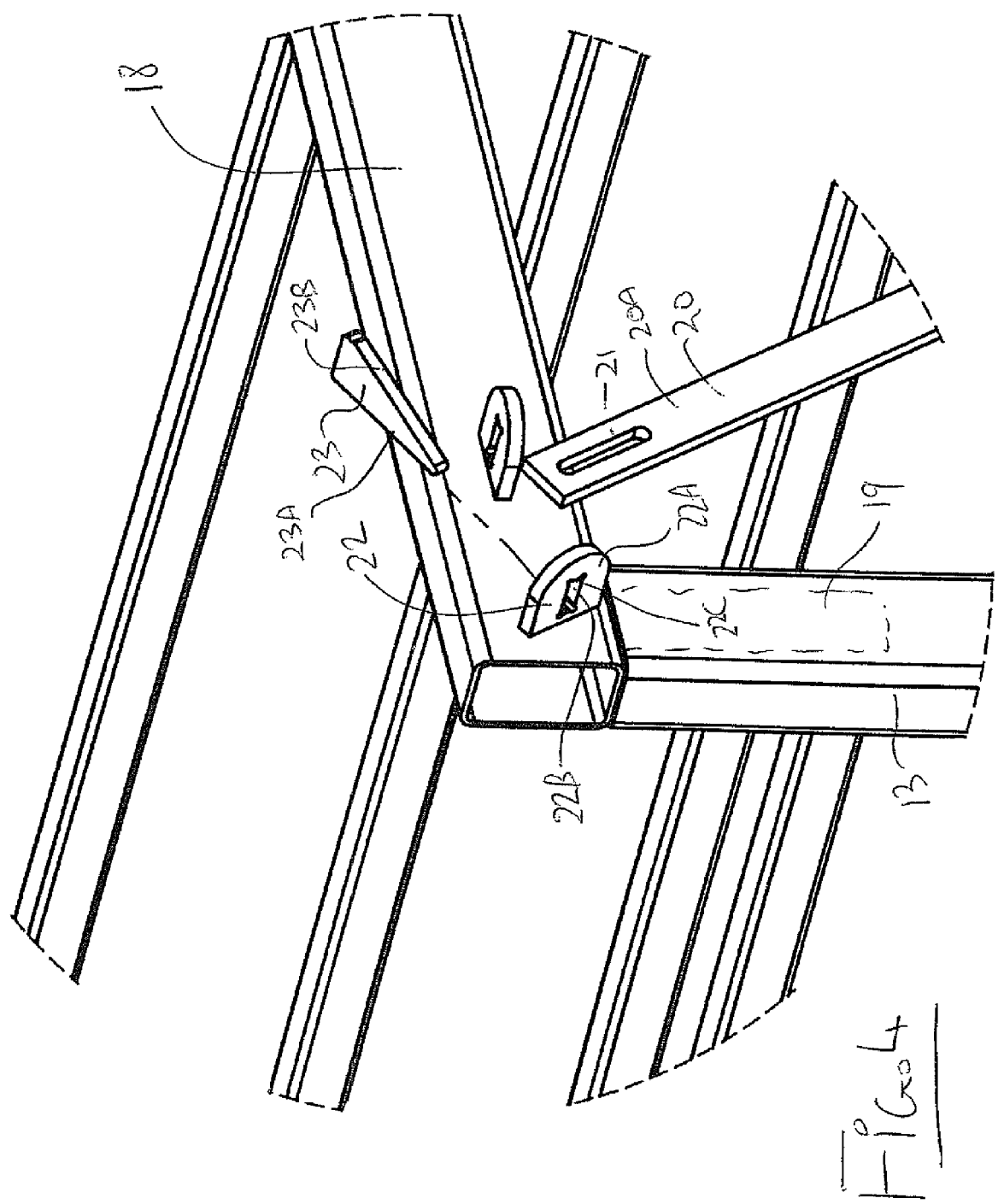
FIG. 4 is a partly exploded and enlarged view of a top corner of the rack of FIG. 2 showing the connection between the upright and the top bridge member and the brace.

The rack is completed by a pair of diagonal braces 20 across the posts of each frame extending between the top of an upright of said one frame and the bottom of an upright of said next adjacent frame. As best shown in FIG. 4, the braces are formed as flat metal straps and engage the top and bottom bridging members at the rails 18 so as to hold the bridging members in engagement with the uprights thus preventing the bridging members from moving apart.

Each of the braces includes at each end a slot 21 for engagement over a tab 22 such that the tab 22 extends into the slot with a portion 22A of the tab exposed beyond the brace 20 and wherein there is provided a slot shaped opening 22B in the exposed portion 22A of the tab for receiving a wedge member 23 driven into the opening to hold the exposed portion 22A tight in the slot 21 of the brace 20.

The wedge member 23 has tapered sides 23A and 23B so as to provide a wedging action between an end 22C of the slot 22B and a surface 20A of the brace 20. The wedge member is preferably a flat metal plate so as to fit in the slot 22B.

The slot 21 extends longitudinally of the brace and the tab 22 lies at an angle to the upright 13 so as to pass through the slot.

As shown in FIG. 5, the bottom bridging members 17 include foot pads 25 on an underside of the rail 18 for attachment to a supporting surface by bolt holes 25A.

As shown in FIGS. 1 and 2, the top bridging members 16 are attached to respective roof trusses 30 for supporting a roof panel 31 to cover the rack. The trusses 30 are tapered so as to support the roof at an inclined angle for water shedding.

Each truss 30 is attached to the rail 18 of the respective top bridging member 16 by a depending flange 35 which includes a slot 36 for engagement over a tab 37 attached to the rail 18 of the top bridging member 16. The tab 31 extends into the slot 36 with a portion 37A of the tab exposed beyond the flange 35. There is provided an opening 38 in the exposed portion of the tab for receiving a wedge member 40 driven into the opening 38 to hold the exposed portion 37A tight in the slot 36 of the flange 35.

The structure thus includes simple pieces which can be easily and separately transported to the necessary remote location. The structure is assembled without any nuts and bolts simply by locating the tabs in the lots and by hammering the wedge into place. This simple fastening serves to square up and brace the structure and to hold the top and bottom together. The structure so formed can be carried on wooden footing rails or on piles with a simple attachment while supporting a very high load of core boxes.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A rack comprising:
   a plurality of rows of core sample boxes;
   a plurality of rectangular support frames;
   each frame being formed as a separate transportable unit;
   each frame including a plurality of spaced parallel tubular metal uprights;
   each frame including a plurality of parallel support tubular metal rails attached to the tubular metal uprights at spaced positions therealong and extending at right angles thereto such that the tubular metal uprights and the tubular metal rails lie in a common plane of the frame with the ends of the tubular metal rails welded to the sides of the tubular metal uprights;
   the rails supporting the rows of core sample boxes extending between the frames so that each row sits on respective ones of the rails of the frames;
   the frames being connected by top and bottom bridging members;
   the top bridging member comprising a top metal tube extending between a top of the tubular metal upright of one frame and a top of the tubular metal upright of a next adjacent frame;
   the top bridging member including a pair of insert members at right angles to the top metal tube each for sliding insertion into a top end of a respective one of the tubular metal uprights;
   the bottom bridging member comprising a bottom metal tube extending between a bottom of the tubular metal upright of one frame and a bottom of the tubular metal upright of a next adjacent frame;
   the bottom bridging member including a pair of insert members at right angles to the bottom metal tube each for sliding insertion into a bottom end of a respective one of the tubular metal uprights.

2. The rack according to claim 1 wherein each frame includes three uprights.

3. The rack according to claim 1 wherein there are only two frames for supporting the core racks along their length.

4. The rack according to claim 1 wherein the insert members are C-shaped in cross section.

5. The rack according to claim 1 wherein there is provided a first diagonal brace extending between the top of an upright of one frame and the bottom of an upright of a next adjacent frame and a second diagonal brace extending between the bottom of the upright of said one frame and the top of the upright of said next adjacent frame.

6. The rack according to claim 5 wherein the braces are formed as flat metal straps.

7. The rack according to claim 5 wherein the braces engage the top and bottom bridging members so as to hold the bridging members in engagement with the uprights.

8. The rack according to claim 7 wherein the top and bottom bridging members each include tabs thereon and wherein the braces include at each end a: slot for engagement over a respective one of the tabs such that the respective one of the tabs extends into the slot with a portion of the respective one of the tabs exposed beyond the brace and wherein there is provided an opening in the exposed portion of the respective one of the tabs for receiving a wedge member driven into the opening to hold the exposed portion tight in the slot of the brace.

9. The rack according to claim 8 wherein the opening is a slot and the wedge member is a flat metal plate.

10. The rack according to claim 1 wherein the bottom bridging members include foot pads on an underside for attachment to a supporting surface.

11. The rack according to claim 1 wherein there are provided roof trusses each of which is attached to a respective one of the top bridging members for supporting a roof panel to cover the rack.

12. The rack according to claim 11 wherein each truss is attached to the respective top bridging member by a depending flange which includes a slot, wherein the top bridging member includes a tab attached thereto, wherein the slot is arranged for engagement over the tab attached to the top bridging member such that the tab extends into the slot with a portion of the tab exposed beyond the flange and wherein there is provided an opening in the exposed portion of the tab for receiving a wedge member driven into the opening to hold the exposed portion tight in the slot of the flange.

13. The rack according to claim 12 wherein the opening is a slot and the wedge member is a flat metal plate.

* * * * *